Patented Dec. 19, 1933

1,940,432

UNITED STATES PATENT OFFICE 1,940,432

ART OF DISPERSING WATER-IMMISCIBLE BODIES

Oscar F. Neitzke, Cambridge, Mass., assignor to Bennett, Incorporated, East Cambridge, Mass., a corporation of Massachusetts No Drawing. Application December 23, 1929
Serial No. 416,100

11 Claims. (Cl. 134—1)

This invention relates to the art of dispersing water-immiscible bodies in water, being more particularly concerned with the dispersion of "thermoplastic hydrocarbons," by which expression is meant such bodies as paraffin and the normally solid asphalts, which are characterized by their chemical inactivity and their solidity under usual atmospheric temperature conditions, and their capability of being liquefied under the application of heat without undergoing decomposition.

I have found that the thermoplastic hydrocarbons are miscible in molten condition with molten rosin, but it is sometimes necessary to employ temperatures considerably above the melting points of either thermoplastic material to ensure their complete miscibility. For instance, even in the case of asphalts having a melting point below 212° F., which asphalts I preferably employ, it is necessary to use temperatures above 250° F., since at below this temperature the asphalt floats on the rosin. I have further found that a heat-liquefied mixture of thermoplastic materials at such high temperatures as described may be dispersed in water by disseminating a solution of a suitable saponifying agent, such as a caustic alkali, throughout the mixture. In order to obtain a dispersion of fine particle size, it is necessary that the saponifying solution be at a temperature sufficiently high so that the temperature of the resultant composition is above that of the melting point of either thermoplasic component of the liquefied mixture but below that of the boiling point of the saponifying solution. It is further necessary to effect a substantially instantaneous dissemination of the saponifying solution throughout the mixture, since otherwise a localized action takes place, particularly when the mixture is at a temperature materially above that of the saponifying solution, for instance, at 300° F., as there is a tendency to generate considerable steam unless there is quick transfer of heat from the mixture to the solution, whose specific heat is much higher than that of the mixture.

A practically instantaneous dissemination of the saponifying solution throughout the molten thermoplastic mixture may be obtained by uniting the mixture as a continuously moving stream of comparatively small volume with a similar stream of saponifying solution, and intimately mixing the streams immediately as they come in contact. Under these conditions, it is possible to effect an exceedingly rapid and uniform saponifying action on the rosin to produce rosin soap, which acts to protect the exceedingly fine molten particles of thermoplastic material released from the mixture by saponification of the rosin constituent. The resulting product is an aqueous dispersion of thermoplastic material containing rosin soap, which serves as a protective colloid for the fine particles of thermoplastic hydrocarbon and unsaponified rosin.

In carrying out a process such as described, the rosin and thermoplastic hydrocarbon may be melted and heated to the desired temperature in a batch. The saponifying solution may be prepared and heated to the desired temperature in a batch. A stream of melted mixture and a stream of saponifying solution under the proper temperature conditions may be withdrawn at the desired rates from their respective batches, brought together, and immediately mixed while passing as a stream through a reaction chamber which is preferably jacketed so that water or other suitable medium at the desired temperature may be passed through the jacket. This makes possible a quick change of temperature in the stream of dispersed product, as the transfer of heat to or from the stream of comparatively small volume to the jacketing medium under conditions of intimate mixing is very rapid. Such temperature change is highly desirable in the production of dispersions of paraffin wax, as in such case it is desirable to chill the dispersion rapidly immediately after its formation to a temperature somewhat below that of the melting point, 130° F., of the wax, in order to avoid large particle size as a result of the tendency of the molten particles of paraffin to coalesce when allowed to cool under atmospheric temperature conditions. In the case of asphalt dispersions, no rapid chilling is necessary, as there is comparatively little tendency for the molten particles of asphalt to coalesce.

While I am unable to account precisely for this difference in characteristics between paraffin wax dispersions and asphalt dispersions, nevertheless it seems to be traceable to the crystallizing properties of paraffin wax. Although paraffin is a colloidal hydrocarbon and of complex composition, it is my theory that in passing from molten to solid state, it tends to undergo crystallization as does paraffin when precipitated as pentagonal or hexagonal crystals from a chloroform solution by addition of ethyl alcohol. The size of the crystals appears to depend upon the rate of change from molten to solid state, in the same way as the size of crystals formed from a hot aqueous solution of crystallizable substance depends upon the rate of cooling the solution,—a slow cooling favoring large crystals, and a rapid cooling resulting in small crystals. In the case of paraffin wax, a change of temperature from a few degrees above its melting point to a few degrees below its melting point is accompanied by a complete conversion from a highly fluid condition to a solid condition, and this change, if rapidly effected, in the case of a water-dispersed, molten paraffin-wax is evidently accompanied by little increase in particle size because of crystallizing tendencies.

A process such as hereinbefore described makes possible the production of stable aqueous dispersions of exceedingly fine particle size and having a dispersed solids content of as high as 40% to 50%. The resulting dispersions, being of high solids content, may be stored or shipped with low water content and may then be readily diluted to the consistency desired for use.

In producing paraffin dispersions, various proportions of paraffin and rosin may be used, for instance, from as high as 85% paraffin and as low as 15% rosin to as low as 15% paraffin and as high as 85% rosin. Assuming that a mixture of about 50% paraffin and about 50% rosin is employed, the mixture is melted and heated to about 220° F., which temperature is materially above the melting point of the paraffin (130° F.) and above the melting point of the rosin (about 180° F.). The heat-liquefied thermoplastic mixture is then commingled as a regulated stream flowing, say, at the rate of 15 pounds per minute with a regulated stream of 5% caustic soda solution at 110° F., flowing, say, at the rate of 20 pounds per minute. Under these conditions, an aqueous dispersion of a solids content of about 45% and at a temperature of about 155° F. is produced, which when suddenly chilled to a temperature below 130° F. to prevent coalescence of dispersed particles, is of a creamy consistency. In producing asphalt dispersions, at least about 35% rosin, based on the total weight of thermoplastic material, should be used in order to produce a stable dispersion of fine particle size. Assuming that a mixture of about 50% asphalt having a melting point of about 150° F. and about 50% rosin is employed, the mixture should be heated to about 300° F., whereupon it is brought in contact with a caustic soda solution under practically the same conditions as in the case of the paraffin dispersion, except that the solution should be at 150° to 160° F. The resulting dispersion has a temperature of about 200° F., and when permitted to cool, is of a smooth, soft, paste-like consistency.

In the foregoing examples, the rosin employed was a so-called "G gum rosin" and under the conditions given therein practically its entire saponifiable content of about 92% was saponified. Such practically complete saponification is desirable, in that it makes possible the production of highly concentrated dispersions which do not set into solid condition upon cooling, in which condition, it would be exceedingly difficult to effect dilution of the dispersion with water. It is possible, however, to effect a less complete saponification of the rosin and at the same time avoid the production of dispersions which cake or harden upon cooling, by employing a larger amount of caustic soda solution of a alkalinity insufficient to effect complete saponification, but this expedient results in less concentrated dispersions. Other grades of gum rosin or the various grades of wood rosin may be employed.

In the case of both the paraffin and asphalt dispersions, it is preferable to employ from 1% to 5% Montan wax in the mixture of thermoplastic materials, as it has been found that the use of this material enhances the stability of the resulting dispersion. Evidently the comparatively small amount of soap formed by reaction of the caustic soda and the so-called montanic acid of the Montan wax affords an excellent protective colloid for the dispersed particles, in addition to that afforded by the rosin soap.

I have specified that the caustic soda solution should be at about 150° to 160° F. before it is commingled with the rosin-asphalt mixture, and that the mixture should be at about 300° F. These temperature factors are critical in the production of satisfactory asphalt dispersions and should not be departed from to any marked degree. For instance, if the solutions were employed at much lower temperature, localized chilling would take place, with the attendant formation of large particles of congealed asphalt. On the other hand, if the solution were employed at much higher temperature, considerable water would flash into steam, as the temperature of the resultant composition would be above the boiling point of the aqueous medium. This, too, would be a localized action which would tend to maintain the asphalt in the continuous phase. Any grade of normally solid asphalt having a melting point below 212° F. may be employed as a raw material, but unless heated to about 300° F., it is incompletely miscible with the rosin. Aside from this fact, however, even those asphalts having a so-called melting point as low as 150° F. are highly viscous materially above their melting points, and it is only when a temperature of about 300° F. is reached when they are sufficiently fluid to be intimately mixed with the caustic soda solution. On the other hand, at temperatures much higher than 300° F., rosin undergoes oxidation and polymerization, so that it is not safe to go much above 300° F. if it is desired to produce a dispersion in which the rosin soap appears in much the same condition as the usual rosin size. When the hot caustic soda solution contacts with the heat-liquefied, rosin-asphalt mixture, there is some evolution of steam, but as soon as temperature equalization has been effected, no evolution of steam takes place. As has already been made clear, the process of the present invention makes possible a quick temperature equilibrium, because of the intimate mixing of comparatively small amounts of material at any particular time.

The process of the present invention cannot be considered analogous to those which involve melting a thermoplastic body, such as asphalt, and stirring it into a body of soap solution. When asphalts such as I employ are liquefied by heat and slowly stirred into a soap solution in an endeavor to effect a dispersion, it is found that the asphalt congeals into large-sized particles or lumps, even when the solution is at its maximum temperature. Some asphalts having a so-called melting point as low as 150° F. are too viscous at 212° to 215° F. to undergo dispersion into fine particles. Soap, being colloidal in its nature, does not raise the boiling point of water to any material extent, so that a temperature of about 215° F. would be approximately the maximum temperature of soap solution attainable. It is largely for this reason that dispersions of asphalt as heretofore produced have been characterized by a significant content of particles of microscopic size. While such dispersions may be brought down to a particle size of an order of magnitude of 1/1000 to 1/5000 of an inch in diameter by the use of a colloid mill, the expense due to the enormous power consumption in breaking up the particles is excessive.

Asphalt dispersions produced as herein described are composed of uniformly microscopic particles of an order of magnitude of 1/5000 to 1/10000 of an inch in diameter, and are characterized by their stability even at as low as 1% solids content. Such a dispersion is suitable for use as a paint, at a solids content of about 30%, under which conditions it has remarkably good covering power and is comparable in this respect to the so-called asphalt paints prepared by "dissolving" asphalts in organic solvents. Such paints may be applied with the usual paint brushes and become set under usual room temperature conditions, say, 70° F., as continuous film in about an hour. The dispersion is suitable for use in the impregnation of felts, papers, yarns, textile fabrics, and the like, to render them waterproof. It is an excellent size for paper pulp intended more especially for the production of waterproof wrapping or bag papers, mulch papers, sheathing papers, roofing felts, panel boards, and the like, as the resulting product is free from unsightly asphalt specks appearing when the usual asphalt dispersions are employed. Evidently the usual asphalt dispersions, when added to a dilute aqueous pulp suspension, undergo premature precipitation of a kind in which the particles of asphalt unite into large-sized aggregates, whereas in the case of the dispersion of the present invention no such premature reaction takes place. The dispersed particles may, however, be fixed on the fibers by the use of alum or other suitable salts or acids, in which case a loose precipitate, quite different from that incident to dilution of some dispersions with water, is produced. When the sized pulp is run out on a paper machine, the white water removed during papermaking operations is substantially clear, showing that substantially all the size has been retained by the fibers. Moreover, because of the fine particle size, no gumming of the wires or felts is encountered during the papermaking operation.

The paraffin dispersion is, as in the case of the asphalt dispersion, an excellent waterproofing composition for felts, papers, yarns, textile fabrics, or the like. It is adapted for use on the calender rolls of a paper machine to impart a high gloss or finish to the paper, under which conditions it may be used at very low concentration and maintain its stability. It is also suitable for the sizing of paper pulp in the beater engine, when it is desired to produce high grade bond, ledger, and writing papers, and for the so-called tub-sizing of paper to render it waterproof and to impart thereto the appearance and characteristics of waxed papers produced by dipping in molten paraffin.

Dispersions produced in accordance with the present invention are particularly advantageous for use as paper sizes, in that they contain little, if any, solid material other than those which impart waterproof qualities to the resulting paper. That is to say, the resulting paper does not become loaded with non-sizing materials which tend to decrease its strength and tear resistance. Thus, the rosin soap constituent not only serves as a protective colloid for the dispersed thermoplastic hydrocarbon and rosin, but when precipitated serves, itself, as a size and carries down therewith the dispersed materials on the paper pulp. In carrying out my process of dispersion, it is distinctly preferable to use a caustic alkali, such as caustic soda, as a saponifying agent for the rosin, since not only does it react practically instantaneously upon the rosin under the temperature conditions given, but it does not form solid, non-sizing reaction products, such as the silica gel produced when sodium silicate solution is employed, or gaseous reaction products, such as the carbon dioxide generated when sodium carbonate is employed.

The process of making the dispersion described herein may be carried out in various types of apparatus. It has been found to be particularly adaptable to an apparatus of the type disclosed in the Brown Patent, No. 1,792,067, issued February 10, 1931, although any other type of apparatus in which the heat liquefied thermoplastic materials and saponifying solution may be brought together and mixed while maintained heated and agitated as disclosed herein, may be used successfully.

I claim:

1. A process of producing aqueous dispersions of thermoplastic hydrocarbons, which comprises heating such hydrocarbons together with rosin to a temperature sufficiently high in a large batch to form a completely miscible, heat-liquefied mixture, heating a caustic soda solution in a large batch, progressively withdrawing the heat-liquefied mixture and the caustic soda solution as continuously moving streams of comparatively small volume from the batches, and uniting the streams and intimately mixing them to effect a saponification of at least a portion of the rosin component and a dispersion of the remainder of the heat-liquefied material, including the thermoplastic hydrocarbons in the saponaceous aqueous medium.

2. A process of producing aqueous dispersions of normally solid asphalt having a melting point below about 212° F., which comprises melting and heating such asphalt together with rosin in a large batch to a temperature at which they are completely miscible, heating a solution of a saponifying agent having little or no inherent stabilizing qualities on said dispersion in a large batch to a temperature such that when mixed with an approximately equal proportion by weight of said heat-liquefied asphalt-rosin mixture a temperature above that of the melting point of the asphalt is produced, progressively withdrawing the heat-liquefied mixture and the saponifying solution as continuously moving streams of comparatively small, approximately equal volumes from the batch, and uniting the streams and intimately mixing them to effect a saponification of at least a portion of the rosin component and a dispersion of the remainder of the heat-liquefied material, including the asphalt in the saponaceous aqueous medium.

3. A process of producing aqueous dispersions of normally solid asphalts having a melting point below about 212° F., which comprises melting and heating such asphalt together with at least about an equal proportion by weight of rosin in a large batch to a temperature of about 300° F., heating a solution of saponifying agent in a large batch to about 150° to 160° F., progressively withdrawing the heat-liquefied mixture and the saponifying solution as continuously moving streams of comparatively small, approximately equal volumes from the batches, and uniting the streams and intimately mixing them to effect a saponification of at least a portion of the rosin component and a dispersion of the remainder of the heat-liquefied material, including the asphalt in the saponaceous aqueous medium.

4. A product comprising paraffin wax and Montan wax dispersed in an equeous medium containing rosin soap and the soap constituent resulting from the saponification of saponifiable matter in said Montan wax, said soaps constituting substantially the only stabilizing agents of said dispersion.

5. A product comprising a thermoplastic hydrocarbon and Montan wax dispersed in an aqueous medium containing rosin soap and the soap constituent resulting from the saponification of saponifiable matter in said Montan wax, said soaps constituting the essential stabilizing agents of said dispersion.

6. A process of producing an aqueous dispersion of a thermoplastic hyrocarbon, which comprises heating such hydrocarbon together with a saponifiable body and a comparatively small amount of Montan wax to form a completely miscible, heat-liquefied mixture; heating a solution of a saponifying agent; and intimately mixing the heated solution with the heat-liquefied mixture to effect a saponification of a portion of the saponifiable body, a saponification of saponifiable matter in said Montan wax and a dispersion of the remainder of the heat-liquefied material, including the thermoplastic hydrocarbon, in the saponaceous aqueous medium, said saponified products constituting the essential stabilizing agent of said dispersed materials.

7. A process of producing an aqueous dispersion of a thermoplastic hydrocarbon, which comprises heating such hydrocarbon together with a saponifiable body and a comparatively small amount of Montan wax as a large batch to a temperature sufficiently high to form a completely miscible, heat-liquefied mixture; heating a solution of a saponifying agent of the nature of caustic soda as a large batch; progressively withdrawing the heat-liquefied mixture and the saponifying solution as continuously moving streams of comparatively small volume from the batch; and uniting the streams and intimately mixing them to effect a saponification of at least a portion of the saponifiable body, a saponification of saponifiable matter in said Montan wax, and a dispersion of the remainder of the heat-liquefied material, including the thermoplastic hydrocarbon, in the saponaceous aqueous medium, said saponification products constituting substantially the only stabilizing agents of said dispersion.

8. A product comprising a thermoplastic hydrocarbon and Montan wax dispersed in an aqueous medium containing a soap as the main stabilizing agent and in addition thereto a soap product resulting from the saponification of saponifiable matter in said Montan wax reacted with a true alkali of the nature of caustic soda.

9. A composition of matter comprising Montan wax dispersed in an alkaline aqueous medium containing rosin soap as the main stabilizing agent and a saponified portion of said Montan wax as an additional stabilizing agent.

10. A composition of matter comprising asphalt and Montan wax, dispersed in an alkaline aqueous medium and embodying rosin soap and a saponified portion of said Montan wax as the essential stabilizing agents.

11. A composition of matter comprising paraffin and Montan wax dispersed in an alkaline aqueous medium and comprising as substantially the only stabilizing agents of said dispersion rosin soap and saponified products of said Montan wax.

OSCAR F. NEITZKE.